US011472467B2

(12) United States Patent
Durot et al.

(10) Patent No.: US 11,472,467 B2
(45) Date of Patent: Oct. 18, 2022

(54) STEERING SHAFT FOR A MOTOR VEHICLE AND METHOD FOR THE PRODUCTION THEREOF

(71) Applicants: THYSSENKRUPP PRESTA AG, Eschen (LI); thyssenkrupp AG, Essen (DE)

(72) Inventors: Janick Durot, Widnau (CH); Marius Breuer, Rochester Hills, MI (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 346 days.

(21) Appl. No.: 16/621,162

(22) PCT Filed: Jun. 26, 2018

(86) PCT No.: PCT/EP2018/067120
§ 371 (c)(1),
(2) Date: Dec. 10, 2019

(87) PCT Pub. No.: WO2019/002298
PCT Pub. Date: Jan. 3, 2019

(65) Prior Publication Data
US 2020/0122769 A1 Apr. 23, 2020

(30) Foreign Application Priority Data
Jun. 29, 2017 (DE) ...................... 10 2017 114 534.6

(51) Int. Cl.
*B62D 1/20* (2006.01)
*F16C 3/03* (2006.01)
(Continued)

(52) U.S. Cl.
CPC .................. *B62D 1/20* (2013.01); *F16C 3/03* (2013.01); *F16D 3/06* (2013.01); *F16D 3/38* (2013.01);
(Continued)

(58) Field of Classification Search
CPC ... B62D 1/20; B62D 1/185; F16C 3/03; F16C 2326/24; F16D 3/38; F16D 2300/12
See application file for complete search history.

(56) References Cited

U.S. PATENT DOCUMENTS 2,198,654 A * 4/1940 Calkins .................... F16C 3/03
56/6
5,086,661 A * 2/1992 Hancock ................... F16D 3/76
464/89
(Continued)

FOREIGN PATENT DOCUMENTS

CN 101077712 A 11/2007
CN 102167073 A 8/2011
(Continued)

OTHER PUBLICATIONS

English Translation of International Search Report issued in PCT/EP2018/067120, dated Sep. 27, 2018 (dated Oct. 9, 2018).

*Primary Examiner* — Frank B Vanaman
(74) *Attorney, Agent, or Firm* — thyssenkrupp North America, LLC

(57) ABSTRACT

A steering shaft for a motor vehicle may have an inner shaft, an outer shaft, and a profiled sleeve that is fixed on the inner shaft such that the inner shaft is movable together with the profiled sleeve in an axial direction relative to the outer shaft. The inner shaft and the outer shaft may be coupled in a torque-transmitting manner with the profiled sleeve connected therebetween. The profiled sleeve may comprise an aperture into which a projection on an outer face of the inner (Continued)

shaft engages in a manner that secures the profiled sleeve in position on the inner shaft at least in the axial direction.

17 Claims, 3 Drawing Sheets

(51) Int. Cl.
    *F16D 3/06*     (2006.01)
    *F16D 3/38*     (2006.01)
    *B62D 1/185*     (2006.01)

(52) U.S. Cl.
    CPC .......... *B62D 1/185* (2013.01); *F16C 2326/24* (2013.01); *F16D 2300/12* (2013.01)

(56) References Cited

U.S. PATENT DOCUMENTS

| | | | | |
|---|---|---|---|---|
| 5,243,874 A * | 9/1993 | Wolfe | ............... | F16F 15/126 280/775 |
| 5,417,614 A * | 5/1995 | Dykema | ............... | F16D 3/06 464/162 |
| 5,531,526 A * | 7/1996 | Labedan | ............... | F16C 35/077 384/536 |
| 5,655,621 A * | 8/1997 | Birsching | ............... | F16D 3/38 180/428 |
| 6,149,526 A | 11/2000 | Boersma | | |
| 8,783,128 B2 * | 7/2014 | Dubay | ............... | B23P 15/00 384/42 |
| 2006/0243088 A1 | 11/2006 | Cymbal et al. | | |
| 2006/0243089 A1 | 11/2006 | Cymbal | | |
| 2007/0137378 A1 * | 6/2007 | Bastein | ............... | F16D 3/06 74/493 |
| 2012/0325041 A1 | 12/2012 | Sakuma | | |
| 2017/0356487 A1 | 12/2017 | Müntener | | |
| 2018/0297514 A1 | 10/2018 | Massonnaud | | |

FOREIGN PATENT DOCUMENTS

| | | |
|---|---|---|
| CN | 202641815 U | 1/2013 |
| CN | 104228926 A | 12/2014 |
| DE | 197 50 005 C | 4/1999 |
| DE | 20 2010 017 747 U | 7/2012 |
| JP | 2009-191936 A | 8/2009 |
| WO | 2016/058723 A | 4/2016 |

* cited by examiner

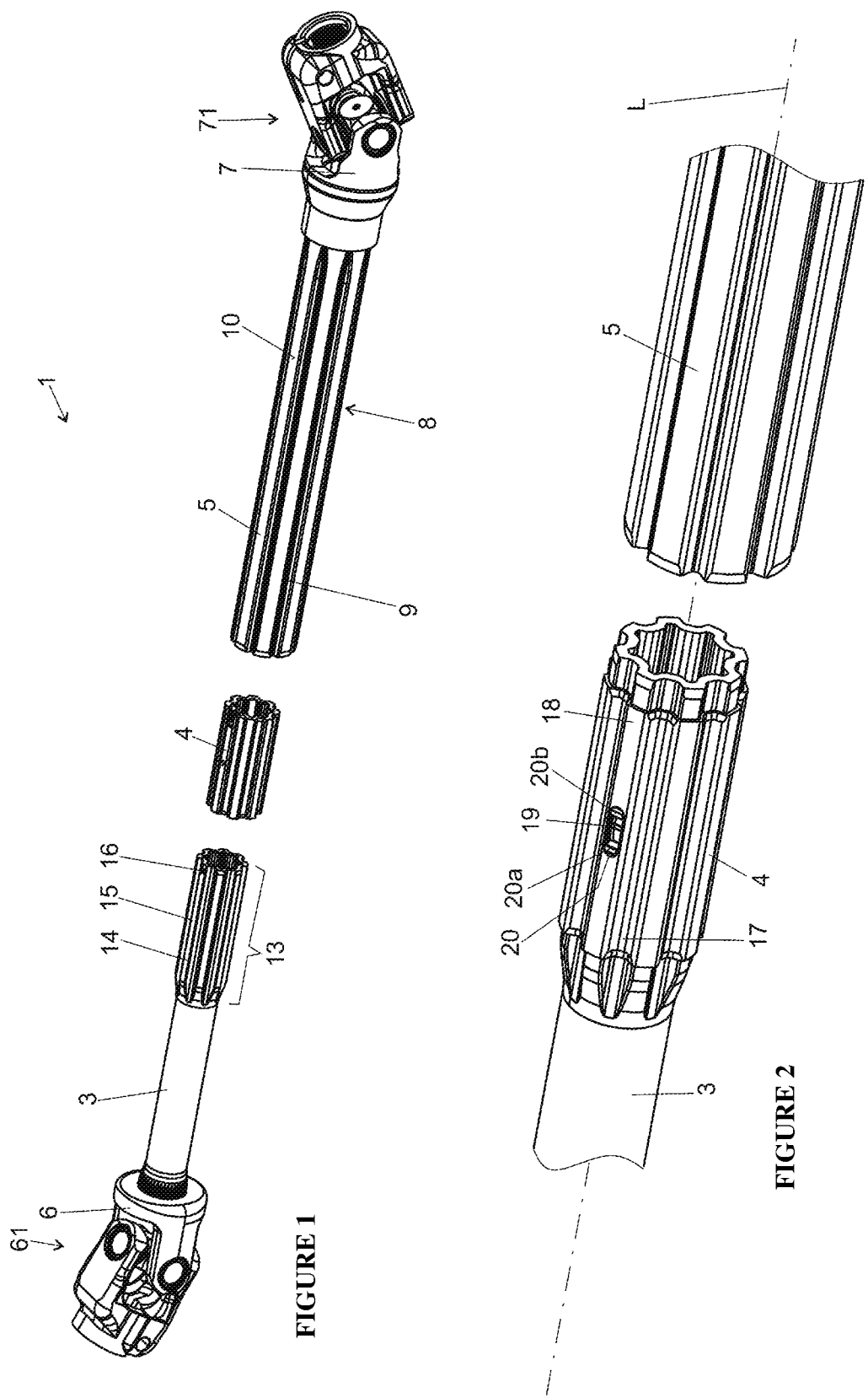

STEERING SHAFT FOR A MOTOR VEHICLE AND METHOD FOR THE PRODUCTION THEREOF

CROSS REFERENCE TO RELATED APPLICATIONS

This application is a U.S. National Stage Entry of International Patent Application Serial Number PCT/EP2018/067120, filed Jun. 26, 2018, which claims priority to German Patent Application No. DE 10 2017 114 534.6, filed Jun. 29, 2017, the entire contents of both of which are incorporated herein by reference.

FIELD

The present disclosure generally relates to motor vehicle steering shafts, including methods for making steering shafts.

BACKGROUND

A steering shaft and a method for production are known from WIPO Patent Publication No. WO 2016/058723 A1. The steering shaft comprises an inner shaft and an outer shaft. A profiled sleeve is arranged and fixed on the inner shaft in the region of an end section. The inner shaft is plugged with the profiled sleeve arranged on it into the outer shaft on the end side, in such a way that the inner shaft can be moved together with the pro-filed sleeve in the outer shaft in the axial direction in order to set the length.

Furthermore, a steering shaft for a motor vehicle is disclosed in document DE 20 2010 017 747 U1. The profiled sleeve which can also be called a sliding sleeve is fixed on the outer face of the inner shaft with the aid of latching lugs which are arranged on the outer face of the inner shaft and in each case lie opposite an end of the profiled sleeve when the profiled sleeve is arranged on the outer face of the inner shaft, with the result that the profiled sleeve is secured on the inner shaft in the axial direction. It has been shown that this type of fastening of the profiled sleeve on the inner shaft leads to problems, in particular on account of different thermal coefficients of expansion of the materials which are used for the inner shaft and the profiled sleeve. Stressing of the profiled sleeve occurs in the case of temperature changes, with the result that the profiled sleeve is situated in forced states.

Document DE 1 975 005 C1 discloses a further steering shaft having a profiled sleeve which is arranged between the inner shaft and the outer shaft.

Thus a need exists for a steering shaft for a motor vehicle and a method for production, in the case of which improved fixing of the profiled sleeve is made possible.

BRIEF DESCRIPTION OF THE FIGURES

FIG. 1 is a diagrammatic perspective view of an example steering shaft for a motor vehicle, with an example inner shaft, an example outer shaft, and a profiled sleeve being shown separately from one another.

FIG. 2 is a diagrammatic perspective view of a section of the steering shaft from FIG. 1, with a profiled sleeve arranged and fixed on the inner shaft.

DETAILED DESCRIPTION

Figure 4:
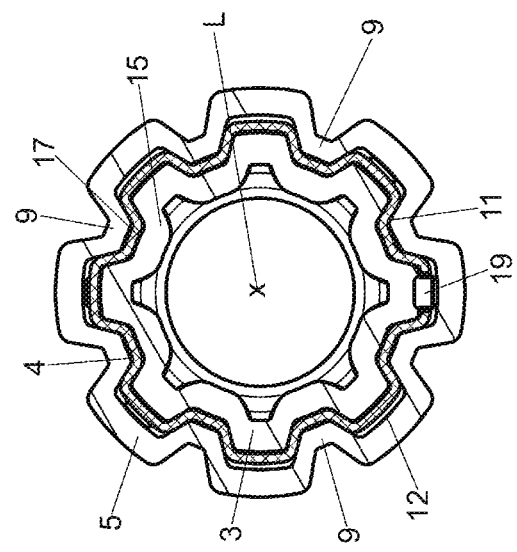
FIG. 4 is a diagrammatic cross-sectional view of the steering shaft with the inner shaft, the profiled sleeve, and the outer shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In accordance with one aspect, a steering shaft for a motor vehicle is provided. The steering shaft comprises an inner shaft, an outer shaft and a profiled sleeve. The profiled sleeve is arranged on the inner shaft and is fixed thereon, in such a way that the inner shaft can be moved together with the profiled sleeve in the axial direction with respect to the outer shaft, the inner shaft and the outer shaft being coupled in a torque-transmitting manner with the profiled sleeve connected in between. The profiled sleeve comprises an aperture, into which a projection which is arranged on an outer face of the inner shaft engages in a manner which secures the profiled sleeve in its position on the inner shaft at least in the axial direction.

In accordance with a further aspect, a method for producing a steering shaft for a motor vehicle is provided. In the case of the method, an inner shaft and an outer shaft are provided. A profiled sleeve which comprises an aperture is arranged on the inner shaft. The profiled sleeve is fixed on the inner shaft, a projection which is arranged on an outer face of the inner shaft being arranged here in the aperture of the profiled sleeve, and the profiled sleeve thus being secured in its position on the inner shaft at least in the axial direction. The inner shaft with the profiled sleeve is introduced into the outer shaft, in such a way that the inner shaft together with the profiled sleeve can be moved in the outer shaft in the axial direction, and the profiled sleeve is arranged here between the inner shaft and the outer shaft.

The inner shaft and the outer shaft can in each case comprise a profile which differs from a cylindrical shape, with the result that the inner shaft and the outer shaft engage into one another in a torque-transmitting manner for the transmission of a torque with the profiled sleeve connected in between. The inner shaft preferably comprises an outer profile which is of corresponding configuration with respect to an inner profile of the outer shaft.

The inner shaft can be configured as a hollow shaft or as a solid shaft. The outer shaft is configured as a hollow shaft.

The projection protrudes radially to the outside from an outer surface of the inner shaft, and protrudes at least partially into the aperture of the profiled sleeve.

The profiled sleeve is preferably arranged in the region of an end section of the inner shaft and is fastened on the latter.

The axial direction or the longitudinal direction is to be understood to mean the direction of the longitudinal axis of the steering shaft.

The aperture can be configured as a single aperture or as an aperture with a plurality of part apertures, it being possible for the plurality of part apertures to be formed separately from one another. In the case of a plurality of part apertures, one or more of the part apertures can be engaged through by an associated projection on the outer face of the inner shaft when the profiled sleeve is fixed on the inner shaft.

The aperture can be arranged in a central profiled sleeve section in the longitudinal direction of the profiled sleeve. In the case of one embodiment, a thermally induced change in a dimension of the profiled sleeve, in particular in the axial direction, can thus take place substantially symmetrically with respect to the central position of the aperture of the profiled sleeve, without the seat of the profiled sleeve on the inner shaft being influenced disadvantageously. The aperture can be arranged at least partially within a central third of the profiled sleeve. The central third results from a uniform division of the profiled sleeve in the longitudinal direction into three sections of identical size, the central section forming the central third.

The aperture can be formed with a slot. The aperture can comprise one or more slots, it being possible for part apertures to be formed by way of the latter. In one embodiment, part apertures are configured on opposite sides of the profiled sleeve. In the case of the one slot or the plurality of slots, longitudinal sides which lie opposite one another can extend substantially parallel to the longitudinal direction of the profiled sleeve. In the case of this embodiment or other embodiments, the projection can be configured with regard to the aperture area so as to enclose the latter substantially completely.

End stops can be formed by way of the projection, which end stops lie opposite one another in the longitudinal direction of the profiled sleeve, are assigned to ends of the aperture, and come into contact with the latter. The end stops which lie opposite one another can come into contact with associated ends of the slot. In the case of this embodiment or other embodiments, the ends of the aperture can run rectilinearly and transversely with respect to the longitudinal direction of the profiled sleeve, or can be configured as rounded ends, for example with a semicircular shape.

The projection can be formed from a plurality of part projections. The plurality of part projections can engage into a single aperture or into different part apertures.

The plurality of part projections can be arranged spaced apart from one another on the outer face of the inner shaft. As an alternative, a single projection can be provided which extends continuously on the outer face of the inner shaft, and to this extent is configured in one piece.

The plurality of part projections can be formed separately from one another on the outer face of the inner shaft.

The projection or the part projections and the inner shaft are preferably configured as a single-piece integral component.

The projection can be formed on the outer face of the inner shaft by means of a material bulge. A plurality of material bulges can be formed or produced, for example so as to lie opposite ends of the aperture on both sides. As an alternative or in addition to material bulges, the projection can be formed by means of an adhesively bonded, soldered and/or welded component which is fixed by means of joining on the outer face of the inner shaft in the region of the aperture after the arranging of the profiled sleeve on the inner shaft.

An outer face of the projection can lie at least in sections against an inner face of the aperture in a positively locking manner. The positively locking configuration can be of circumferentially continuous or interrupted configuration on the aperture. In particular, the projection can lie against the inner face of the aperture in a positively locking manner in the ends of the aperture which lie opposite one another in the axial direction.

The aperture can be arranged at least in sections in the region of a radially projecting section of an outer-face profiling of the profiled sleeve. The aperture can be arranged completely in the region of the radially projecting section of the outer-face profiling of the profiled sleeve. As an alternative, the aperture can be arranged completely or partially in the region of a radially recessed section of the outer-face profiling of the profiled sleeve.

The projection can engage through the aperture completely in the radial direction. Here, the projection can project to the outside in the radial direction in relation to the aperture. As an alternative, the projection is formed with an overall height in the radial direction, which overall height is smaller than the height of the wall in the region of the aperture in the radial direction.

The projection can comprise a radially oriented flange section. The flange section can be configured as a material bulge.

The outer shaft and/or the inner shaft can comprise a profiling, it being possible for an outer profiling to be formed on the outer side of the inner shaft and an inner profiling to be formed on the inner face of the outer shaft in a manner which corresponds to one another. For example, the profilings can comprise surface sections which project and are recessed in the radial direction, for example in such a way that sections which project from the outer face of the inner shaft engage into recessed regions of the inner face of the outer shaft and vice versa when the inner shaft and the outer shaft are pushed onto one another in an overlapping section, in such a way that the profiled sleeve is arranged with a likewise corresponding profiling between the inner shaft and the outer shaft.

The inner shaft, the outer shaft and/or the profiled sleeve can consist of different materials or the same material. For example, a production from metals such as steel or a fiber reinforced material can be provided. The profiled sleeve is preferably formed from a plastic.

The advantageous developments which are described in the above text in conjunction with the profiled hollow shaft can be provided mutatis mutandis in conjunction with the method for production.

FIG. 1 shows a diagrammatic perspective illustration of a steering shaft 1 for a motor vehicle. The steering shaft 1 comprises an inner shaft 3, a profiled sleeve 4 which is to be arranged on the inner shaft 3, and an outer shaft 5. The inner shaft 3 and the outer shaft 5 are configured in each case as a hollow shaft. It is also conceivable and possible, however, that the inner shaft is configured as a solid shaft. The inner shaft 3 and the outer shaft 5 can be manufactured as hollow shafts from a steel or, as an alternative, from aluminum alloys, stainless steel, fiber composite materials or the like.

On the end side, the outer shaft 5 and the inner shaft 3 in each case comprise a fork 6, 7 which forms a part of a universal joint 61, 71, in order to integrate the steering shaft 1 into a steering line. As an alternative, a coupling section for the attachment of a steering wheel can be provided instead of one of the forks 6, 7.

According to FIG. 1, the outer shaft 5 is profiled in the region of a section 8, in which the inner shaft 3 is pushed in with the profiled sleeve 4 which is fixed on it (cf. FIG. 2). Here, the profiling of the outer shaft 5 comprises grooves 9 which run as radially inwardly projecting sections in the direction of the longitudinal axis L of the outer shaft 5. The grooves 9 on an outer circumferential face 10 of the outer shaft 5 form an internal toothing 11 on an inner circumferential face 12 of the outer shaft 5 (cf. FIG. 4).

It can be gathered from FIG. 2 that an end section 13 of the inner shaft 3, which end section 13 is plugged into the outer shaft 5 in an operating state, comprises an external toothing system 14 which corresponds with the internal toothing 11 of the outer shaft 5. The external toothing system 14 of the inner shaft 3 is formed with grooves 15 on an outer circumferential face 16 of the inner shaft 3. The profiled sleeve 4 is arranged on the external toothing system 14 of the inner shaft 3, which profiled sleeve 4 corresponds both with the external toothing system 14 of the inner shaft 3 and with the internal toothing 11 of the outer shaft 5. The profiled sleeve 4 is fixed on the inner shaft 3, with the result that the profiled sleeve 4 can move together with the inner shaft 3 in the outer shaft 5 relative to the latter.

In order to meet rigidity requirements of the steering shaft 1, there can be a very low play which can as it were be called "play-free" between the inner shaft 3, the profiled sleeve 4 and the outer shaft 5. Here, a sliding fit is provided which permits an adjustment of the length of the steering shaft 1 with a constant force level which tends to be low.

Figure 3:
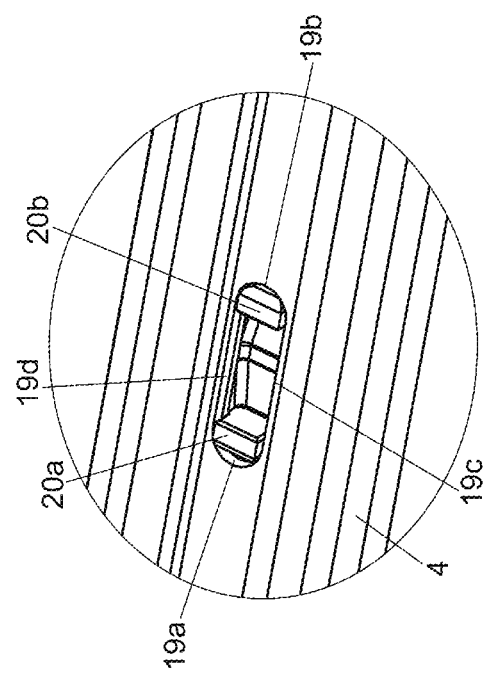
FIG. 3 is a detailed view of an example fastening device of the profiled sleeve.

According to FIG. 2, the profiled sleeve 4 comprises an aperture 19 in the region of a section 18 of the profiling which projects radially with respect to grooves 17, into which aperture 19 a projection 20 engages which is arranged on the outer circulating or circumferential face 16 of the inner shaft 3 and is formed by way of two part projections 20a, 20b which come into contact in the region of opposite ends 19a, 19b of the aperture 19 (cf. FIG. 3), in order to fix the profiled sleeve 4 on the inner shaft 3, at least in the axial direction. This can be seen further in detail in FIG. 3.

FIG. 4 shows a cross-sectional illustration through the steering shaft 1 in the region of the aperture 19. It can be seen that the profiling of the outer shaft 5 corresponds with the profiling of the profiled sleeve 4 and the profiling of the inner shaft 3. Thus, for example, the groove 9 of the outer shaft 5 comes into contact with one of the grooves 17 of the profiled sleeve 4 or the groove 15 of the inner shaft 3. In this way, the inner shaft 3 and the outer shaft 5 are in a torque-transmitting engagement with the profiled sleeve 4 connected in between.

Figure 5:
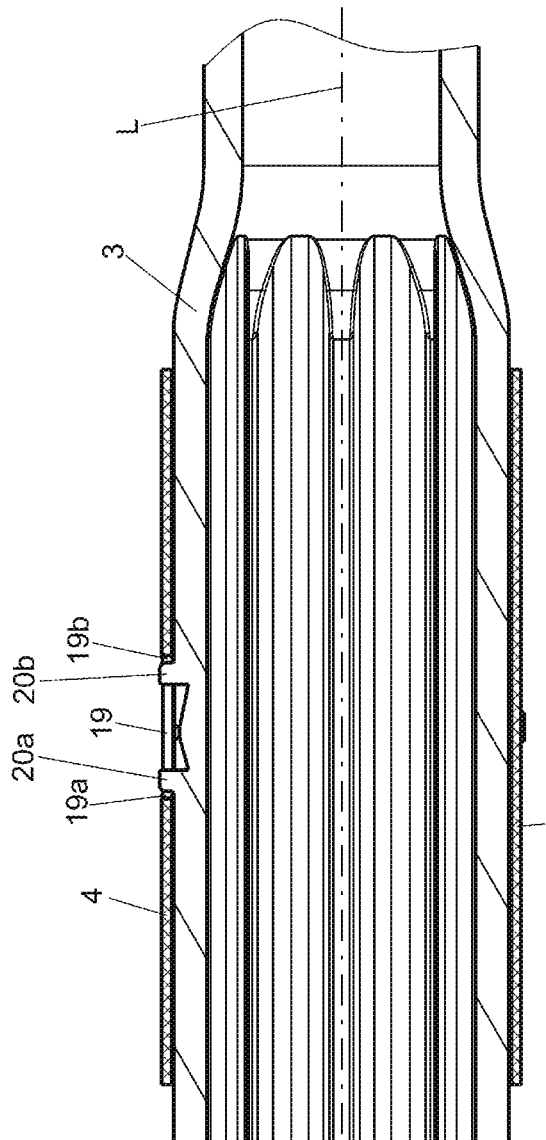
FIG. 5 is a diagrammatic view of a section of a profiled hollow shaft with a profiled sleeve in a section in a longitudinal direction.

FIG. 5 shows an illustration of a section of the steering shaft 1 in the region of the profiled sleeve 4 which is fixed on the inner shaft 3, in longitudinal section. The part projections 20a, 20b are produced in each case as a material bulge, which is shown further in detail in FIG. 6. Radially projecting flange sections 21a, 21b are set against the ends 19a, 19b of the aperture 19.

The aperture 19 is configured as a slot, in the case of which opposite longitudinal sides 19c, 19d run parallel to the direction of the longitudinal axis L of the steering shaft 1 or the profiled sleeve 4.

Figure 6:
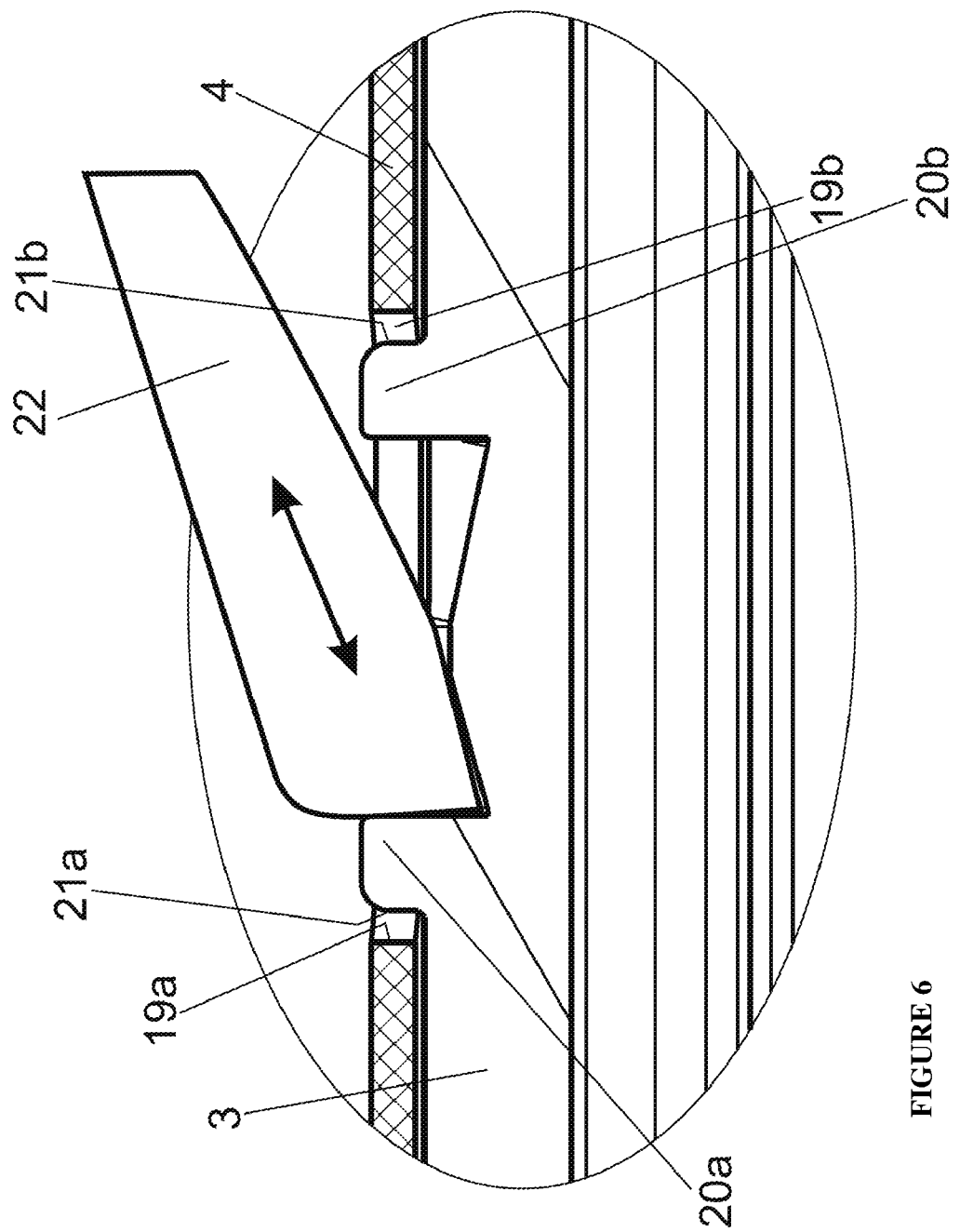
FIG. 6 is a diagrammatic view for fixing a profiled sleeve on an outer face of an inner shaft.

According to FIG. 6, the configuration of the projection 20 with the part projections 20a, 20b takes place, after the profiled sleeve 4 is pushed onto the inner shaft 3, in the region of the aperture 19 by means of a tool 22, in order thus to fix the profiled sleeve 4 on the inner shaft 3. Subsequently, the inner shaft 3 with the profiled sleeve 4 which is fixed on it can be plugged into the outer shaft 5 (cf. FIG. 2). After the plugging-in operation, a pull-out securing means is formed by means of a plastic deformation of the outer shaft 5, with the result that the inner shaft 3 can no longer be pulled completely out of the outer shaft 5.

The tool 22 or the movement direction of the tool is preferably inclined with respect to the longitudinal axis L.

The features which are disclosed in the above description, the claims and the drawing can be of significance for the implementation of the various embodiments both individually and in any desired combination.

LIST OF DESIGNATIONS

1 Steering shaft
3 Inner shaft
4 Profiled sleeve
5 Outer shaft
6, 7 Fork
8 Section
9, 15, 17 Groove of profiling
10 Outer circumferential face of the outer shaft 5
11 Internal toothing of the outer shaft 5
12 Inner circumferential face of the outer shaft 5
13 End section of the inner shaft 3
14 External toothing system of the inner shaft 3
16 Outer circumferential face of the inner shaft 3
18 Radially projecting section of profiling
19 Aperture
19a, 19b End of the aperture 19
19c, 19d Longitudinal sides of the aperture 19
20 Projection
20a, 20b Part projection
21a, 21b Flange sections
22 Tool
61, 71 Universal joint

What is claimed is:

1. A steering shaft for a motor vehicle, the steering shaft comprising:
   an inner shaft that includes an outer face and a projection disposed on the outer face;
   an outer shaft; and
   a profiled sleeve that is fixed on the inner shaft such that the inner shaft is movable together with the profiled sleeve in an axial direction relative to the outer shaft, wherein the inner and outer shafts are coupled in a torque-transmitting manner with the profiled sleeve connected therebetween, wherein the profiled sleeve comprises an aperture into which the projection engages in a manner that secures the profiled sleeve in position on the inner shaft at least in the axial direction,
   wherein the projection comprises two part projections that are in direct contact with opposing axial ends of the aperture.

2. The steering shaft of claim 1 wherein the aperture is disposed in a central profiled sleeve section in a longitudinal direction of the profiled sleeve.

3. The steering shaft of claim 1 wherein the aperture is a slot.

4. The steering shaft of claim 1 wherein the two part projections are distinct from one another and form end stops, wherein the end stops lie opposite one another in the axial direction of the profiled sleeve, wherein the end stops are assigned to the axial ends of the aperture.

5. The steering shaft of claim 1 wherein the two part projections are distinct from one another and are spaced apart in the axial direction.

6. The steering shaft of claim 1 wherein the two part projections are configured as distinct material bulges that are disposed on the outer face of the inner shaft, wherein a first of the material bulges is disposed at and in direct contact with a first of the axial ends of the aperture, wherein a second of the material bulges is disposed at and in direct contact with a second of the axial ends of the aperture.

7. The steering shaft of claim 1 wherein outer faces of the two part projections lie against an inner face of the aperture in a positively locking manner.

8. The steering shaft of claim 1 wherein the aperture is disposed at a radially protruding section of a toothing system that extends around an entire circumference of the profiled sleeve.

9. The steering shaft of claim 1 wherein the projection engages through the aperture entirely in a radial direction.

10. The steering shaft of claim 1 wherein the projection comprises a radially oriented flange section.

11. The steering shaft of claim 1 wherein the projection and the inner sleeve are configured as a single-piece integral component.

12. The steering shaft of claim 1 wherein a radial extent of the two part projections is less than a radial extent of a wall of the aperture such that the two part projections of the inner sleeve protrude radially only partially into the aperture of the profiled sleeve.

13. The steering shaft of claim 1 wherein the projection is disposed in a positive locking configuration with the aperture whereby the projection is in circumferentially intermittent contact with the aperture.

14. The steering shaft of claim 1 wherein the projection is disposed at a radially recessed section of a toothing system that extends around an entire circumference of the inner shaft, wherein the aperture is disposed at a radially recessed section of a toothing system that extends around an entire circumference of the profiled sleeve.

15. The steering shaft of claim 1 wherein the two part projections extend farther radially than a portion of the inner sleeve that is axially between the two part projections.

16. A method for producing a steering shaft for a motor vehicle, the method comprising:
   providing an inner shaft;
   providing an outer shaft;
   positioning a profiled sleeve on the inner shaft, wherein the profiled sleeve comprises an aperture;
   positioning the profiled sleeve on the inner shaft;
   adhesively bonding, soldering, or welding a projection within the aperture to an outer face of the inner shaft after the profiled sleeve is positioned on the inner shaft such that the profiled sleeve is secured in position on the inner shaft at least in an axial direction; and
   introducing the inner shaft with the profiled sleeve into the outer shaft such that an end section of the inner shaft is movable together with the profiled sleeve in the outer shaft in the axial direction, wherein the profiled sleeve is disposed between the inner and outer shafts.

17. A method for producing a steering shaft for a motor vehicle, the method comprising:
   providing an inner shaft;
   providing an outer shaft;
   positioning a profiled sleeve on the inner shaft, wherein the profiled sleeve comprises an aperture;
   positioning the profiled sleeve on the inner shaft;
   after the profiled sleeve is positioned on the inner shaft, forming a projection within the aperture on an outer face of the inner shaft by using a tool to deform the outer face of the inner shaft such that the profiled sleeve is secured in position on the inner shaft at least in an axial direction; and
   introducing the inner shaft with the profiled sleeve into the outer shaft such that an end section of the inner shaft is movable together with the profiled sleeve in the outer shaft in the axial direction, wherein the profiled sleeve is disposed between the inner and outer shafts.

\* \* \* \* \*